March 21, 1950
H. F. GADE
2,501,040
METHOD AND MEANS FOR MANUFACTURING
SELF-LOCKING NUTS
Filed April 25, 1947
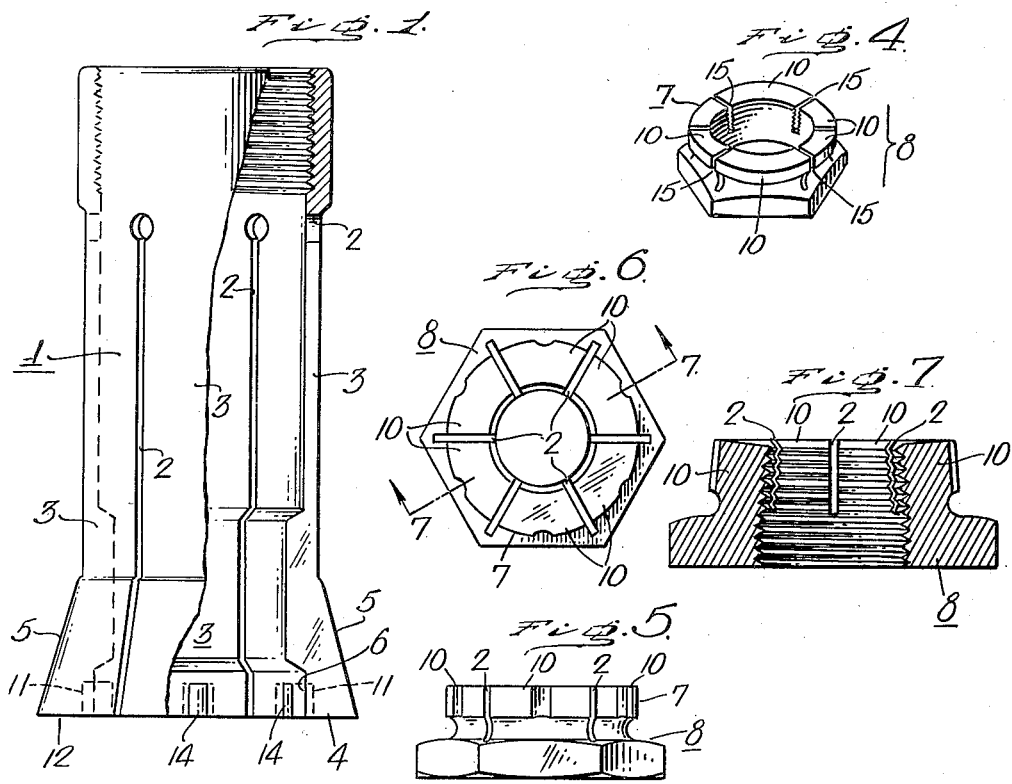
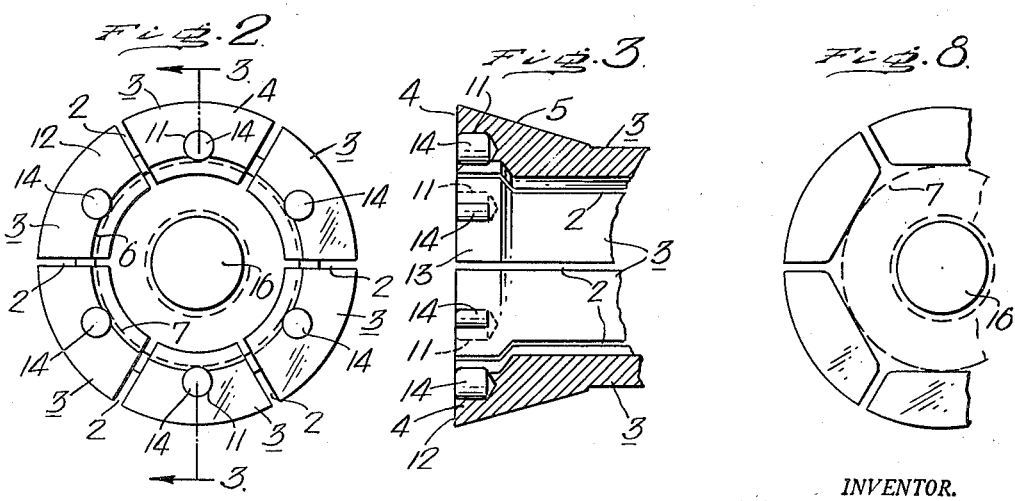
INVENTOR.
Harald F. Gade
BY
Howson & Howson
Attys.

Patented Mar. 21, 1950

2,501,040

UNITED STATES PATENT OFFICE 2,501,040

METHOD AND MEANS FOR MANUFACTURING SELF-LOCKING NUTS

Harald F. Gade, Philadelphia, Pa., assignor to Standard Pressed Steel Co., Jenkintown, Pa., a corporation of Pennsylvania Application April 25, 1947, Serial No. 743,873

1 Claim. (Cl. 10—86)

This invention relates to self-locking nuts and more particularly to that type of nut wherein the nut body is slit in the axial direction at one end so as to provide a plurality of segmental elements which, when displaced inwardly toward the axis of the nut, constitute in effect spring fingers which resiliently engage the bolt, stud or threaded member upon which the nut may be threaded, thereby creating the frictional engagement between the two elements which resists displacement of the nut from the normal position.

Nuts of this type are widely used in industry and afford highly satisfactory results. They are subject, however, to a lack of uniformity in the self-locking characteristic, arising in large part from an inability by the prior methods of manufacture to produce the nuts with a uniform degree of angular displacement of the segmental locking elements from their normal parallel relationship with the thread axis of the nut. As a consequence of this lack of uniformity the field of utility of this type of self-locking nut has been restricted to those uses wherein a substantial variance in the torque of the nut is not objectionable.

A principal object of the present invention is to provide a highly practicable and economical method of producing nuts of this type with a high degree of torque uniformity.

The invention will be more readily understood by reference to the attached drawings wherein:

Fig. 1 is a side elevational view of a collet type of closing-in die used in the production of nuts of the stated type in accordance with the principle of my invention;

Fig. 2 is an inverted end view of the die;

Fig. 3 is a fragmentary sectional view on the line 3—3 Fig. 2;

Fig. 4 is a view in perspective of the nut blank;

Fig. 5 is a side elevational view of the finished nut;

Fig. 6 is a plan view of the nut shown in Fig. 5;

Fig. 7 is a sectional view on the line 7—7 Fig. 6; and

Fig. 8 is a view corresponding to Fig. 2 and illustrating a modification within the scope of the invention.

With reference to the drawings, the closing-in die shown in Figures 1 to 3 inclusive is of the collet type and consists of the usual hollow elongated body member 1 having longitudinal slots 2 extending from the working end of the die and dividing the die circumferentially into a plurality of elongated flexible segments or fingers 3. At the working end the wall of the die is thickened, as indicated at 4, to provide the tapering outer wall 5, and the die is provided at this end with a countersunk recess 6 which is dimensioned to receive the cylindrical outer end 7 of the nut blank 8 shown in Fig. 4. Insofar as described this portion of the die will be recognized as conventional and its mode of operation will be obvious.

In accordance with the invention each of the segments 3 of the die is provided with a cylindrical recess 11 which extends inwardly from the terminal end surface 12 of the die in a direction paralleling the axis of the latter, and each said recess intersects the peripheral surface 13 of the countersunk recess 6. Each of the recesses 11 receives a cylindrical insert 14 composed of a relatively hard material, such as Carboloy, and it is apparent by reference to Figures 2 and 3 that the cylindrical side of each of these inserts projects into the recess 6. As indicated in Fig. 2 the said recess is of sufficient diameter to permit insertion of the cylindrical portion 7 of the nut blank within the imaginary cylinder defined by the inner sides of the inserts 14.

In operation the nut blank 8 is inserted in the recess of the die with the slots 15 between the segments 10 in alignment with the slots 2 of the die. When the die is closed, as by means of the usual closing sleeve (not shown) which engages the inclined outer side surfaces 5 of the die in conventional manner, the respective inserts 14 will be brought into engagement with the respective segments 7 of the nut blank at the centers of said segments. Continued closing of the die will apply pressure through the inserts against the said segments 10 sufficient to displace the latter inwardly towards the axis of the nut. This displacement continues beyond the elastic limit of the metal of the nut blank. The inward displacement will be limited by a pilot rod 16 which extends through the center of the die 1 and through the cylindrical portion of the nut as indicated in Figure 2, and the inward movement of the segments 3 of the die and of the inserts 14 through which the die contacts the segments of the nut is continued until after the nut segments have engaged the pilot rod 16, so that the diameter of the pilot rod will, in effect, determine the effective diameter of the threaded bore of the nut in the cylindrical portion 7. In accordance with the invention and for reasons set forth below, the inward movement of the die segments is in excess of that required to bring the nut segments into contact with the pilot rod, and as a result the metal of the nut within the limited areas where the inserts 14 engage the nut segments will be upset, so that the finished nut will exhibit a small recess in the outer surface of each of the segments 10 where the pressure of the inserts 14 has displaced the nut metal. Since the pressure of the die upon the nut segment is confined entirely to the inserts 14, and since the pressure area is therefore extremely small, the upsetting of the metal of the nut will be highly localized and will not affect the crests of the nut threads where they engage the pilot rod 16.

By this means it is possible to obtain an extremely uniform and accurately dimensioned end product in spite of the unavoidable dimensional variations in the nut blank and variations in the properties of the metal of the blank. Heretofore, employing the conventional methods of closing-in the segments 10 of the nut, these variations in size and material resulted in corresponding variations in the end product. By closing in the nut segments by pressures applied at localized points, so that excess pressure upon the nut blank will result merely in an upsetting of the metal within the highly localized areas at the outer surfaces of the segments, it is feasible to give the die segments a closing-in movement sufficiently in excess of that required to bring the nut segments against the pilot to compensate for any dimensional or other variations that might be present in the nut blanks.

In the embodiment illustrated in Fig. 8, the inner wall of the countersunk recess of the closing-in die which receives the segmental portion of the nut is made hexagonal in form so that contact between the segments of the die and the segments of the nut will occur along lines where the flat side walls of the die segments engage the cylindrical surface of the nut segments. Displacement of the die segments beyond that required to bring the nut segments into engagement with the pilot rod will manifest itself in a highly localized upsetting of the metal of the nut along the lines of contact between the said segments. It will be apparent that other modification in the form of the closing-in devices is possible without departure from the invention as defined in the appended claim.

I claim:

In the manufacture of self-locking nuts of the type described comprising locking segments displaced inwardly toward the axis of the nut to constrict the threaded bore of the latter, the method which comprises applying pressure by way of closing-in elements to a limited area of the outer surface of each of said segments, limiting the displacement of said segments by means of a pilot member located within the said bore, and extending the closing-in movement of said elements materially beyond that required to bring the segments into contact with said pilot as demonstrated by displacement of a minor part of the metal of said segments by said elements within said pressure area.

HARALD F. GADE.

REFERENCES CITED

The following references are of record in the file of this patent:

UNITED STATES PATENTS

| Number | Name | Date |
| --- | --- | --- |
| Re. 22,243 | Gade | Jan. 5, 1943 |
| 884,125 | Brightman | Apr. 7, 1908 |
| 1,594,515 | Bruhn | Aug. 3, 1926 |
| 1,898,264 | Proefke | Feb. 21, 1933 |
| 2,279,388 | Cox | Apr. 14, 1942 |
| 2,299,085 | Gade | Oct. 20, 1942 |

FOREIGN PATENTS

| Number | Country | Date |
| --- | --- | --- |
| 211,150 | Switzerland | Nov. 1, 1940 |